(12) United States Patent
Papadimitrakopoulos

(10) Patent No.: US 7,131,537 B2
(45) Date of Patent: Nov. 7, 2006

(54) SEPARATION OF SINGLE WALL CARBON NANOTUBES

(75) Inventor: Fotios Papadimitrakopoulos, Coventry, CT (US)

(73) Assignee: The University of Connecticut, Storrs, CT (US)

(*) Notice: Subject to any disclaimer, the term of this patent is extended or adjusted under 35 U.S.C. 154(b) by 399 days.

(21) Appl. No.: 10/326,616

(22) Filed: Dec. 20, 2002

(65) Prior Publication Data

US 2003/0168385 A1    Sep. 11, 2003

Related U.S. Application Data

(60) Provisional application No. 60/343,055, filed on Dec. 20, 2001.

(51) Int. Cl.
*B03B 7/00* (2006.01)

(52) U.S. Cl. .................. 209/18; 977/845; 977/901

(58) Field of Classification Search ............ 209/3, 209/18, 39, 40; 977/DIG. 1
See application file for complete search history.

(56) References Cited

U.S. PATENT DOCUMENTS

| | | | | |
|---|---|---|---|---|
| 6,187,823 | B1 | 2/2001 | Haddon et al. ............. 516/32 |
| 6,426,134 | B1* | 7/2002 | Lavin et al. ............. 428/300.1 |
| 6,696,565 | B1* | 2/2004 | Fenniri .................... 544/244 |
| 6,783,746 | B1* | 8/2004 | Zhang et al. ............ 423/447.1 |
| 6,790,425 | B1* | 9/2004 | Smalley et al. .......... 423/447.1 |
| 6,884,405 | B1* | 4/2005 | Ryzhkov ................. 423/447.1 |
| 2002/0184969 | A1* | 12/2002 | Kodas et al. ............... 75/330 |
| 2003/0001141 | A1* | 1/2003 | Sun et al. .............. 252/301.35 |
| 2003/0185741 | A1* | 10/2003 | Matyjaszewski et al. ..................... 423/445 R |
| 2004/0040834 | A1* | 3/2004 | Smalley et al. ............ 204/164 |
| 2004/0129447 | A1* | 7/2004 | Beeli et al. .............. 174/125.1 |
| 2004/0232073 | A1* | 11/2004 | Papadimitrakopoulos ... 210/634 |
| 2005/0067349 | A1* | 3/2005 | Crespi et al. ............... 210/634 |

OTHER PUBLICATIONS

Strano et al., Electronic Structure Control of Single-Walled Carbon Nanotube Functionalization, Sci. 301:1519-1522 (Sep. 12, 2003).*
Zheng et al., Structure-Based Carbon Nanotube Sorting by Sequence-Dependent DNA Assembly, Sci. 302:1545-1548 (Nov. 2003).*
Krupke et al., Separation of Metallic from Semiconducting Single-Walled Carbon Nanotubes, Science Express, (Jun. 26, 2003).*
Chen et al., Dissolution of Full-Length Single-Walled Carbon Nanotubes, Mar. 2001.*
Philip G. Collins et al., Engineering Carbon Nanotubes and Nanotube Circuits Using Electrical Breakdown, Science, vol. 292, Apr. 27, 2001; pp. 706-709.

(Continued)

*Primary Examiner*—Joseph Rodriguez
(74) *Attorney, Agent, or Firm*—Cantor Colburn LLP

(57) ABSTRACT

A method has been developed for the post-synthesis separation of nanotubes by size and/or type. Solubilized, functionalized nanotubes are passed over a GPC column such that length-separated fractions are collected. These length-separated fractions can then further be separated by diameter or type. Particularly useful are methods for separating nanotubes into metallic and semiconducting fractions.

11 Claims, 9 Drawing Sheets

OTHER PUBLICATIONS

I.W. Chiang et al, Purification and Characterization of Single-Wall Carbon Nanotubes, J. Phys. Chem. B, 2001, 105, pp. 1157-1161, Nov. 2001.

Leif O. Brown et al., Formation and Electron Diffraction Studies of Ordered 2-D and 3-D Superlattices of Amine-Stabilized Gold Nanocrystals, J. Phys. Chem. B 2001, 105, pp. 8911-8916, Aug. 2001.

Jie Liu et al., Fullerene Pipes, Science, vol. 280, May 22, 1998, pp. 1253-1256.

Ben Zhong Tang et al., Preparation, Alignment, and Optical Properties of Soluble Poly(phenylacetylene)-Wrapped Carbon Nanotubes, Macromolecules, 1999, 32, pp. 2569-2576, Mar. 1999.

S. Niyogi et al., Chromatographic Purification of Soluble Single-Walled Carbon Nanotubes (s-SWNTs), J. Am. Chem. Soc. 2001, 123, pp. 733-734, Jan. 2001.

Bin Zhao et al., Chromatographic Purification and Properties of Soluble Single-Walled Carbon Nanotubes, J. Am. Chem. Soc. 2001, 123, pp. 11673-11677, Nov. 2001.

\* cited by examiner

Figure 5. UV-Vis spectra of fraction 10 in DMF, (A) prior to, and (B) after sonication for 1 hour.

SEPARATION OF SINGLE WALL CARBON NANOTUBES

CROSS-REFERENCE TO RELATED APPLICATIONS

This application claims the benefits of U.S. Provisional Application Ser. No. 60/343,055 filed Dec. 20, 2001, which is fully incorporated herein by reference.

FIELD OF THE DISCLOSURE

This disclosure relates to carbon nanotubes, and particularly to methods for size and or type separation of carbon nanotubes.

DESCRIPTION OF THE RELATED ART

Over the past four decades, device miniaturization has steadily increased computational power in modem microelectronics by nearly doubling the number of transistors per unit area every twelve to eighteen months (often referred as Moore's law). Currently, however, the size limitations associated with traditional materials and the costs associated with lithographic patterning presents a roadblock in engineering devices with features below 100 nanometers (nm). One promising approach is to assemble functional electronic devices from well-defined nanoscale building blocks such as carbon nanotubes. Particularly useful are single wall carbon nanotubes (SWNTs), which because of their electrical conductivity and small size, can be used as electrical connectors in microdevices such as integrated circuits, or in semiconductor chips used in computers. SWNTs can be either semiconducting or metallic, thus allowing the fabrication of room temperature nanosized devices (e.g. field effect transistors (FETs), logic gates, single electron transistors (SETs), etc.) and possibly interconnects.

One problem in the development of SWNT based molecular electronics is the lack of uniformity in synthesized populations of SWNTs. For use in molecular electronics, it is desirable to separate SWNTs into populations according to length as well as type, metallic or semiconducting. Metallic nanotubes can carry large current densities while semiconducting nanotubes can be switched on and off. Recently, a synthetic methodology to fabricate SWNT single crystals has been demonstrated (Schlittler et al. *Science* 292:1136, 2001). Although both tube diameter and chirality is identical within each crystal, these properties vary between crystals.

Separation of SWNTs post-synthesis is challenging because of the poor solubility of the nanotubes, and their tendency to aggregate. While strategies have been developed for dispersing and solubilizing SWNTs, size and type fractionation of solubilized SWNTs has yet to be demonstrated. Accordingly, there remains a need for methods for separation of SWNTs by size and/or type.

SUMMARY OF THE DISCLOSURE

Disclosed herein is a method of separating nanotubes by length, comprising solubilizing the nanotubes, applying the nanotubes to a gel permeation chromatography column, eluting the nanotubes, and collecting a number of elution fractions, wherein the number of fractions collected is sufficient to separate the nanotubes according to length.

In another embodiment, this disclosure encompasses a length separated nanotube fraction, comprising an eluted fraction prepared according to the disclosed methods.

Further disclosed is a method of separating M-SWNTs and S-SWNTS in a nanotube sample, comprising solubilizing the nanotube sample, applying the solubilized nanotube sample to a gel permeation chromatography column, eluting the nanotubes, and collecting a first number of elution fractions, wherein the first number of fractions collected is sufficient to separate the nanotubes according to size; selecting one or more of the collected fractions, applying the selected fractions to a second gel permeation chromatography column, eluting the nanotubes, and collecting a second number of elution fractions, wherein the second elution is performed under a magnetic field sufficient to separate M-SWNTs and S-SWNTs.

Yet further disclosed is a method of separating nanotubes according to diameter, comprising solubilizing the nanotubes, applying the solubilized nanotubes to a gel permeation chromatography column, eluting the nanotubes and collecting a first number of elution fractions, wherein the first number of fractions collected is sufficient to separate the nanotubes according to length; selecting one or more of the elution fractions, and subjecting the fractions to a second separation sufficient to separate the nanotubes by diameter.

BRIEF DESCRIPTION OF THE DRAWINGS

Referring now to the exemplary drawings wherein like elements are numbered alike in the several FIGURES.

DETAILED DESCRIPTION OF THE PREFERRED EMBODIMENTS

Figure 1:
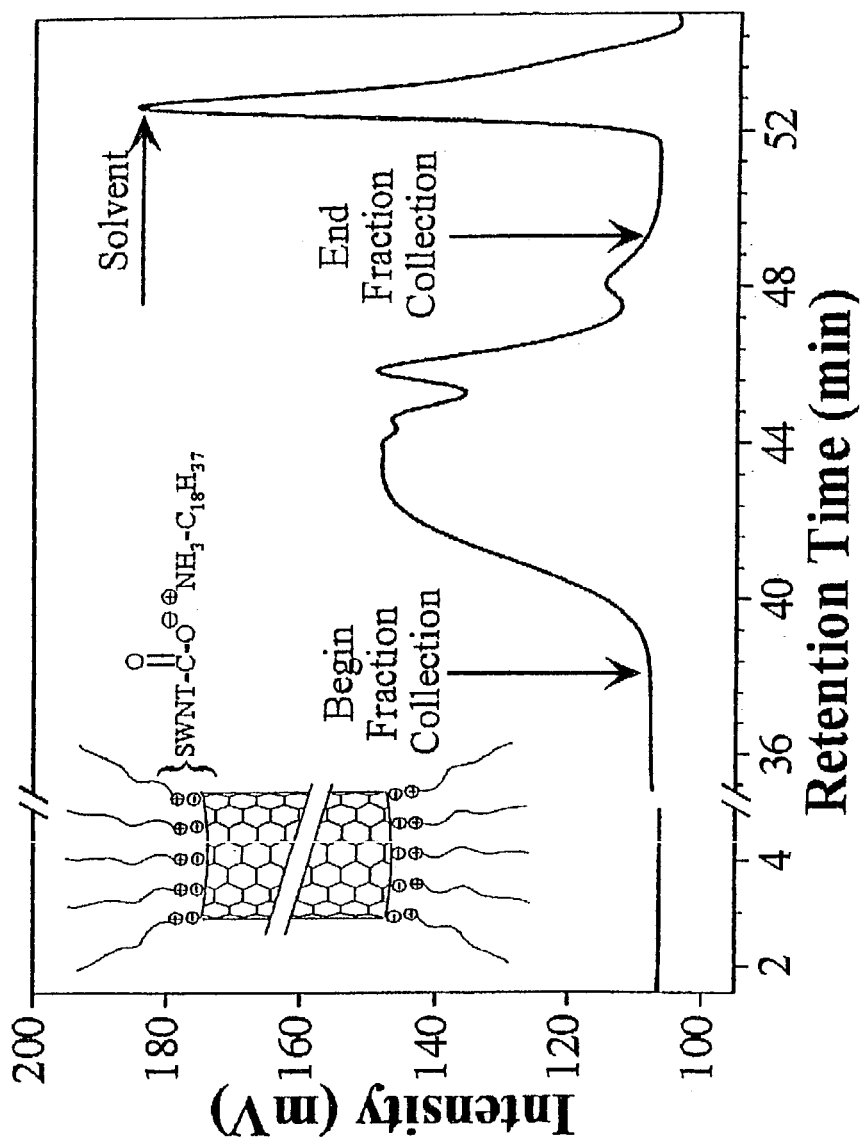
FIG. 1 shows a chromatogram of sSWNTs/zwitterions in THF (Waters 600–996, styragel HMW7 column, refractrometer detector).

Nanotubes are elongated tubular bodies that are composed of a plurality of cylindrically rolled graphite films arranged telescopically. The nanotubes are hollow and have a linear fullerene structure. Nanotubes can be either single wall nanotubes (SWNTs) or multi wall nanotubes (MWNT). A preferred nanotube is a single walled nanotube. Single wall nanotubes can further be subdivided into metallic (M-SWNTs) or semiconducting (S-SWNTs).

Carbon nanotubes are primarily carbon, although the nanotube fiber may further comprise other atoms, such as boron or nitrogen. The carbon used to produce nanotubes may be fullerenes, metallofullerenes, diamond or graphite, including carbon black. Carbon nanotubes can also be produced from hydrocarbons such as paraffins, olefins, diolefins, ketones, aldehydes, alcohols, ethers, aromatic hydrocarbons, or any other compound that comprises carbon. Specific hydrocarbons include methane, ethane, propane, butane, higher paraffins and isoparaffins, ethylene, propylene, butene, pentene, other olefins and diolefins, ethanol, propanol, acetone, methyl ethyl ketone, acetylene, benzene, toluene, xylene, ethylbenzene, and benzonitrile.

Carbon nanotubes may have diameters of about 1 nanometer (nm) for a single-wall carbon nanotube up to about 3 nm, 5 nm, 10 nm, 30 nm, 60 nm or 100 nm for single wall or multi wall carbon nanotubes. Carbon nanotubes may have lengths of about 20 nm up to 1 millimeter (mm), 1 centimeter (cm), 3 cm, 5 cm, or greater.

A preferred SWNT is a shortened SWNT (sSWNT). A SWNT can be shortened by sonication in an oxidizing medium, although other shortening methods are within the scope of this disclosure. Nanotube shortening is performed in the presence of an oxidizing acid to aid in separating the cut pieces from the underlying tubes and to etch the exposed nanotube ends. Preferred acids are mineral acids such as $H_2SO_4$ and $HNO_3$ and mixtures thereof. A preferred lower nanotube length is about 10 nm, preferably about 30 nm and more preferably about 60 nm. A preferred upper nanotube length is about 80 to about 1000 nm, preferably about 230 to about 500 nm.

To separate as-synthesized nanotubes by size and/or type, as-synthesized nanotubes are first solubilized, i.e., treated so as to increase their dispersion in a solvent. Without being held to theory, it is believed that solubilization of nanotubes involves exfoliation of the nanotube bundles. Preferred solvents for nanotubes are organic solvents that include but are not limited to chloroform, dichloromethane, benzene, toluene, chlorobenzene, 1,2-dichlorobenzene, dichlorocarbene, ether, tetrahydrofuran and mixtures thereof.

To aid in solubilization, the nanotubes can be functionalized. Functionalization can be either covalent, noncovalent, or through charge transfer complexes. A preferred functionalization is a zwitterionic fuctionalization as disclosed, for example, in U.S. Pat. No. 6,187,823, wherein a carboxy-fuctionalized nanotube sample is treatd with an amine such as octadecylamine (ODA). Other amines such as nonylamine, dodecylamine, pentacosylamine, tetracontylamine, pentacontylamine and mixtures, or alkylaryl amines such as 4-pentylaniline, 4-dodecylaniline, 4-tetradecylaniline, 4-pentacosylaniline, 4-tetracontylaniline, 4-pentacontylaniline and mixtures thereof may be used, as well as aromatic amines. The functionalization process includes optionally mixing the single-walled carbon nanotubes with the agent in an solvent (eg. toluene, chlorobenzene, dichlorobenzene, dimethylformamide, tetrahydrofuran, hexamethylphosphoramide, dimethylsulfoxide) and heating the nanotubes and the agent to a temperature and for a time effective to funtionalize the nanotubes, for example about 50° to about 200° C., more preferably about 90 to about 100° C., for at least 96 hours.

The solubilized nanotubes are then separated by size and/or type, preferably by chromatography, more preferably by gel permeation chromatography methods. Columns such as those based on polystyrene divinyl benzene resin (commercially available as Ultrastyragel, Walters, Milford, Mass.) or other sizing columns are preferred. If separation other than by size is to be performed, columns such as nanoporous stationary phases with well-defined pore sizes, chiral columns and others may be used. Gel permeation chromatography is particularly useful for separation by length.

Without being held to theory, it is believed that gel permeation chromatography of nanotubes further contributes to solubilization of the nanotubes. While zwitterionic functionalization aids in nanotube solubilization, the solubilization is more complete after gel permeation chromatography as evidence by UV-Vis spectroscopy. Thus gel permeation chromatography leads to better solubilization which then leads to improved size fractionation.

In addition to chromatograph, other techniques such as electrophoresis can be used to separate the solubilized nanotubes. For example, a length separated nanotube fraction can be subjected to electrophoresis to further separate the nanotubes according to diameter.

In addition to separation by size, the nanotubes can be further separated into M- and S-SWNTs. One method to achieve this separation is to perform the elution of fractions in the presence of a magnetic field of a magnitude sufficient to cause separation of M- and S-SWNTs. A preferred nanotube sample is a previously size-selected fraction which is then passed though a second column and eluted in the presence of a magnetic field to give separation of metallic and semiconducting nanotubes. Another method of enriching a sample for M- or S-SWNTs is to repeatedly size fractionate a previously size fractionated nanotube sample. Fractions containing short nanotubes will be enriched for S-SWNTs while fractions containing longer nanotubes will be enriched for M-SWNTs. A fraction enriched for S-SWNTs is preferably greater than 75% S-SWNTs, more preferably greater than 85% S-SWNTs. A fraction enriched for M-SWNTs is preferably greater than 75% M-SWNTs, more preferably greater than 85% M-SWNTs.

All references cited herein are incorporated by reference in their entirety. The disclosure is further illustrated by the following non-limiting Examples.

EXAMPLE 1

Chromatography and Length Distribution of SWNTs

Figure 2:
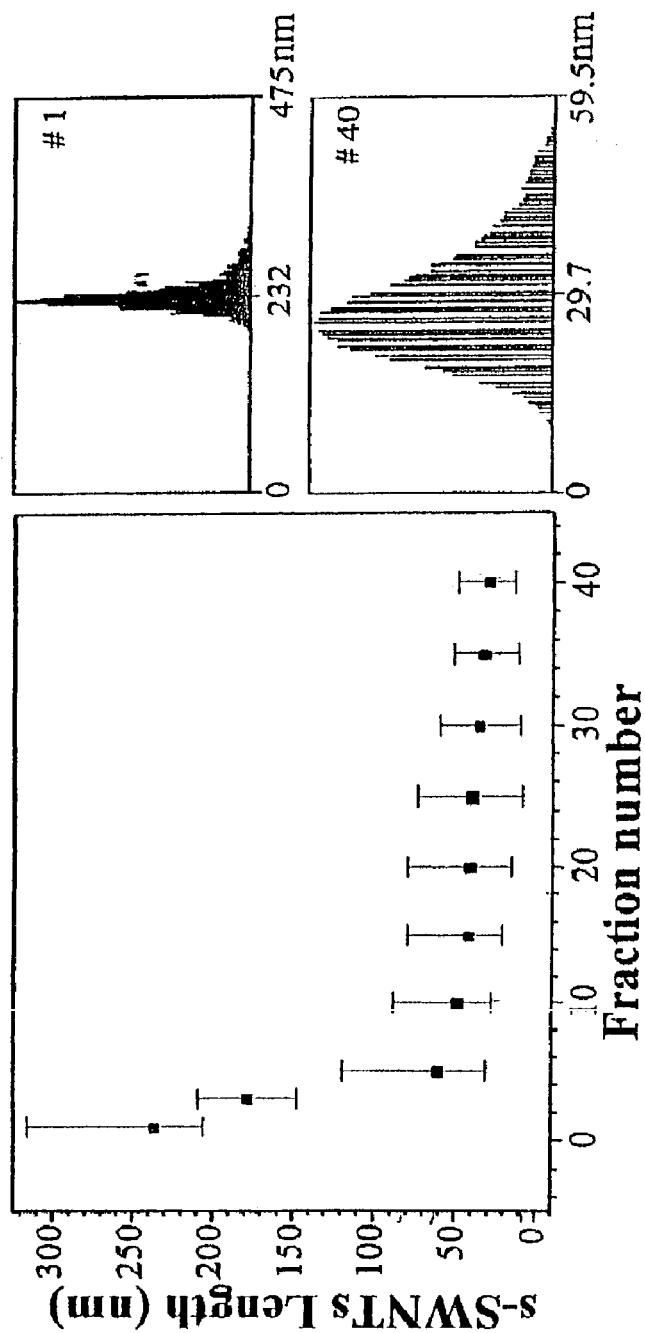
FIG. 2 shows the distribution of sSWNTs lengths after fractionation, as monitored by AFM. The solid squares indicate weight-average length of nanotubes in each fraction whereas the error-bars manifest the length distribution within 98% accuracy. The AFM-generated length histograms for fraction 1 and 40 are also illustrated.

Purified SWNTs (commercially available from tubes@rice) were acid functionalized and shortened by sonicating in a mixture (7:3) of $HNO_3$ and $H_2SO_4$ (Thess et al., *Science* 273, 483, 1996). The carboxy-terminated shortened SWNTs (sSWNTs) were zwitterion-functionalized with octadecylamine (ODA) according to previously established procedures Chen et al., *Science* 282: 95, 1998; Chen et al., *J. Phys. Chem. B* 105: 2525, 2001). 100 µl of the sSWNTs-zwitterion complex in tetrahydrofuran (THF) was injected into a Waters 150-C Plus GPC (Ultrastryragel columns, with THF as the mobile phase). A total of 40 fractions were collected (1 fraction every 15 seconds) during the elution of the broad multi-modal band shown in the chromatogram of FIG. 1. sSWNTs were found to be present in all 40 elution fractions, as monitored by UV-Vis, near IR (NIR) and Raman spectroscopy (Rao et al., *Science* 275:

187, 1997). Atomic force microscopy (AFM) was used to obtain the sSWNTs length distribution per fraction. AFM was performed on sSWNTs deposited on surface-modified silicon substrates (Chattopadhyay et al., *J. Am. Chem. Soc.:* 123, 9451, 2001). FIG. 2 depicts the weight-averaged length and distribution (shown with error bars) as a function of fraction number. Typical AFM-generated histograms for fractions 1 and 40 demonstrate a relatively narrow length distribution within each fraction. The length of sSWNT gradually decreases from 232 nm in fraction 1 to about 29 nm in fraction 40.

EXAMPLE 2

Characterization of Eluting Fractions

Dissolution of ODA-functionalized SWNTs in THF has been demonstrated, where the majority of the bundles were exfoliated in small ropes (2–5 nm in diameter) and a limited amount of individual nanotubes (Chen et al., *J Phys Chem B* 105, 2525, 2001). Assuming the dissolution is a result of the repulsive interaction induced by the ionically attached ODA end-groups, in the case of shortened-SWNTs, the flow-induced shearing through the GPC columns could further reduce aggregation and lead to length fractionation. The UV-Vis spectrum of a typical eluting fraction of sSWNTs in THF is presented in FIG. 3. This spectrum markedly contrasts that of the injected suspension (FIG. 3 inset), which was obtained after extensive sonication in THF and filtration through a 10 µm Teflon™ filter. The profound difference in these two spectra might originate from either the complete exfoliation of the 2–5 nm diameter SWNTs ropes, or from the fractionation by length and possibly type (diameter and/or chirality). The latter two explanations can be excluded based on the spectral resemblance of the fractions and the presence of S- and M nanotubes of various diameters in all 40 fractions. Therefore, the most likely cause for such enhanced spectral resolution is attributed to enhanced unbundling of sSWNTs, leading to complete or nearly complete solubilization.

Figure 3:
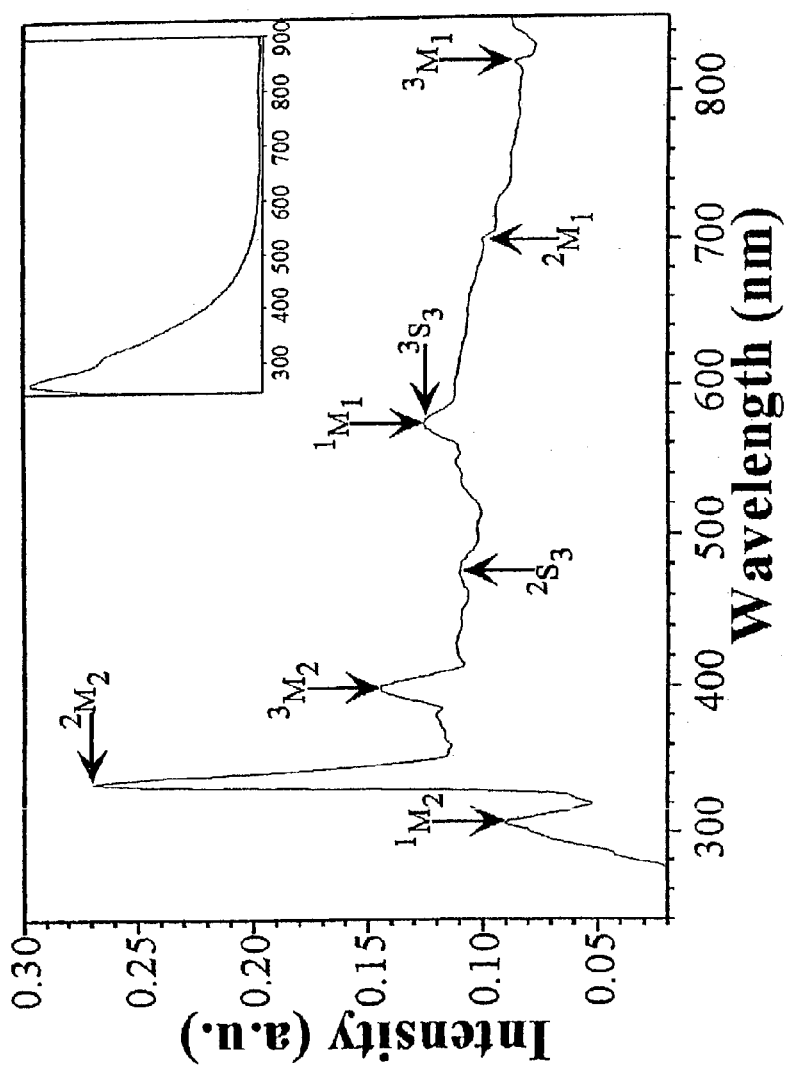
FIG. 3 shows a typical UV-Vis spectrum of the fractionated sSWNTs in THF (fraction 10). The inset illustrates the spectrum of the sSWNT/zwitterion suspension before fractionation.
Figure 4:
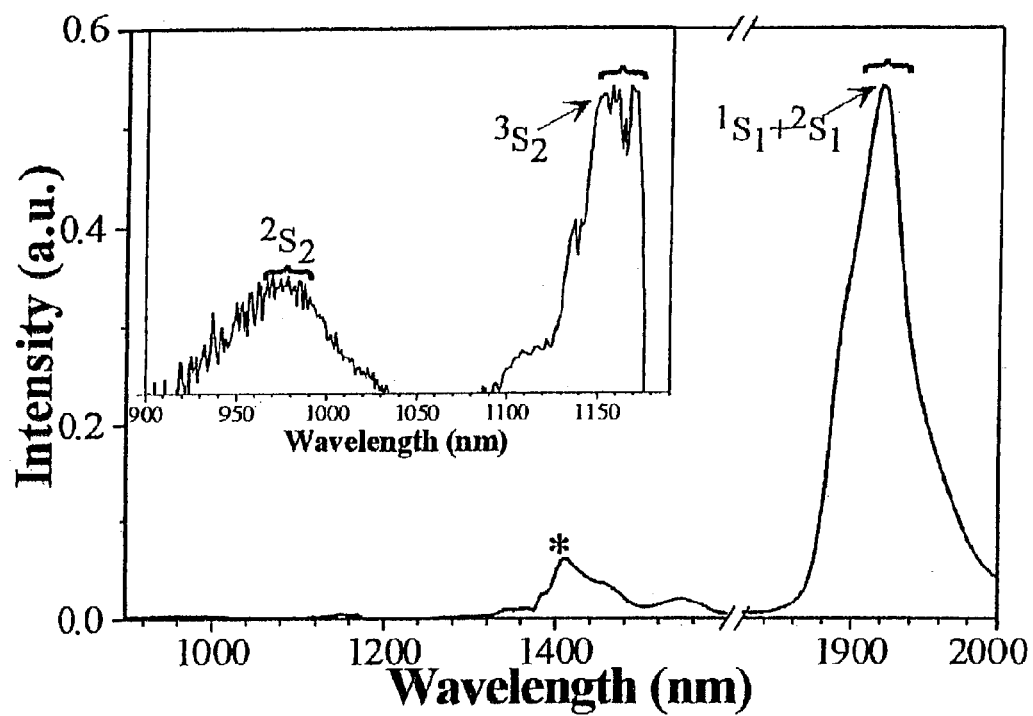
FIG. 4 shows typical NIR spectra for sSWNTs/zwitterion complexes (fraction 10). The inset shows an enlarged view of the spectral transitions in the range of 900 to 1200 nm. (* Possibly due to larger diameter (e.g. 1.9 nm) semiconducting SWNTs)

The indicated absorptions in FIG. 3 can be ascribed to the interband transitions between the mirror image spikes in the density of states (DOS) of SWNTs. As shown in Table 1, these absorption maxima corroborate the presence of at least three M-SWNTs with differing diameters (1.22, 1.33 and 1.6 nm) and two different S-SWNTs (with 1.33 and 1.6 nm diameters). The relative intensities are in agreement with both the narrow diameter distribution and mean value (~1.3 nm) for laser ablated SWNTs. In the UV-Vis region, both of the optically allowed transitions for M-SWNTs are accounted along with one of the three transitions ($3^{rd}$ pair of singularities) for M-SWNTs. The remaining two transitions are also accounted in the NIR region, (see FIG. 4). The most dominant feature appears to be around 1900–2000 nm (0.62–0.68 eV), which unambiguously corresponds to the band gap transitions between the first pair of singularities for the 1.22 and the 1.33 nm diameter semiconducting SWNTs. The spectral features (broad feature at 973 nm, 1.27 eV), shown more clearly in the inset of FIG. 4, are associated with the transitions between the second pair of singularities for the 1.33 nm diameter S-SWNTs. There are also distinct features from 1090–1175 nm, which are associated with transitions between the second pair of singularities for the 1.22 nm diameter S-SWNTs. A series of smaller peaks at 1385 nm (0.89 eV), 1410 nm (0.88 eV) and 1548 nm (0.80 eV) are also apparent and have been previously assigned to the singularities in the density of states (DOS) and band gap transitions for larger diameter S-SWNTs. The plurality of features in the NIR (such as multiple peaks, shoulders and peak broadening) implies the coexistence of large number of S-SWNTs, of different diameters and chiral indices.

TABLE 1

Peak and corresponding SWNT diameter assignments (from FIG. 3), based on theoretical prediction for the optically allowed transitions between pairs of singularities in the DOS for M- and S-SWNTs.

| symbol[a] | DOS transitions | abs wavelength | calculated diameter (nm) | energy (eV) observed | energy (eV) calculated |
|---|---|---|---|---|---|
| $^1M_1$ | metallic 1st pair | 585 | ~1.22 | 2.12 | 2.08 |
| $^2M_1$ | metallic 1st pair | 690 | ~1.33 | 1.80 | 1.88 |
| $^3M_1$ | metallic 1st pair | 820 | ~1.60 | 1.51 | 1.47 |
| $^1M_2$ | metallic 2nd pair | 310 | ~1.22 | 4.00 | 4.10 |
| $^2M_2$ | metallic 2nd pair | 340 | ~1.33 | 3.65 | 3.58 |
| $^3M_2$ | metallic 2nd pair | 396 | ~1.60 | 3.13 | 3.13 |
| $^2S_3$ | semiconducting 3rd pair | 490 | ~1.33 | 2.50 | 2.51 |
| $^3S_3$ | semiconducting 3rd pair | 585 | ~1.60 | 2.12 | 2.08 |

[a]Symbol: $^{no.}TYPE_{transition}$

Figure 5:
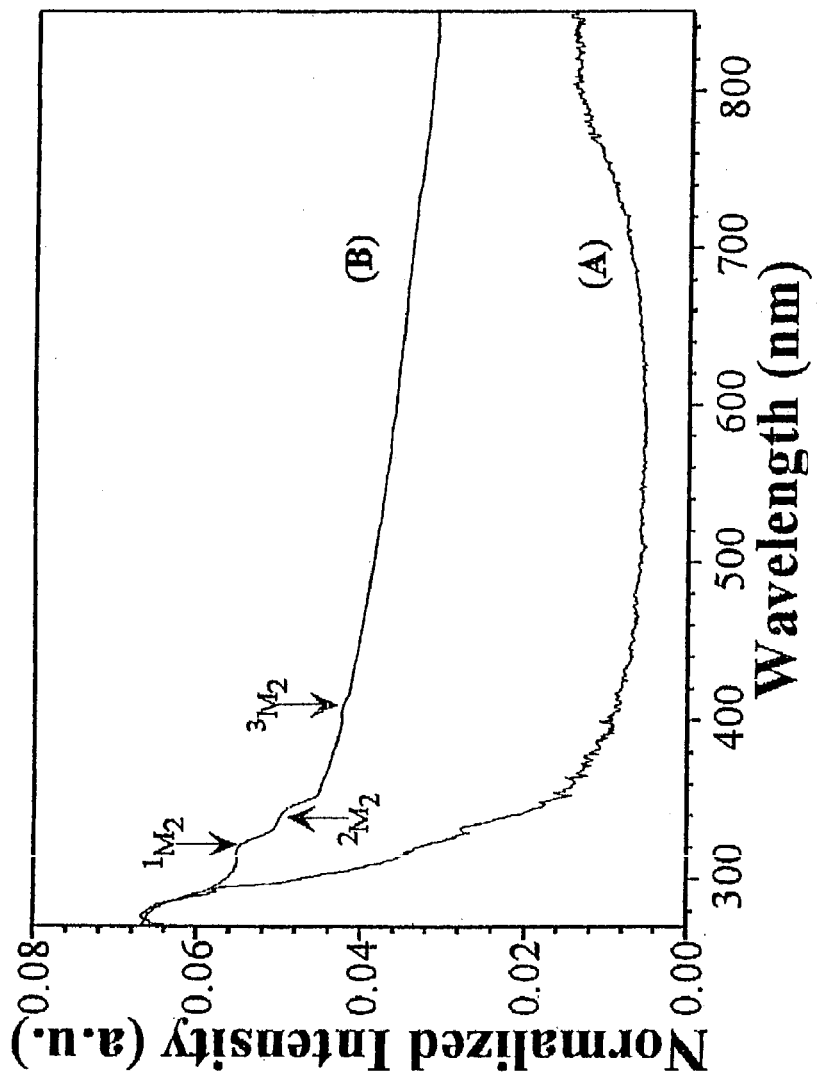
FIG. 5 shows UV-Vis spectra of fraction 10 in DMF, (A) prior to, and (B) after sonication for 1 hour.

In the case of the inset of FIG. 3, the sharp absorption maximum at 270 nm has been related to the π-plasmon frequency (~5 eV). This has been argued to correspond to the collective excitation of π-electron system polarized along the NT axis, and to the first approximation, it provides a good indication of NT aggregation. The absence of this π-plasmon peak in all GPC collected fractions (FIG. 3) further supports the theory that GPC fractionation enhances solubilization. However, solubilization is a dynamic process, and if the fractions are left undisturbed for few weeks, their spectrum reverts back to that before fractionation. To better elucidate the importance of the pendent ODA groups in preventing NT aggregation, we replaced the low dielectric constant THF solvent ($\epsilon_{THF}$=7.6) with a DMF, a higher dielectric constant ($\epsilon_{DMF}$=36.5), capable of dissociating the ionically attached ODA groups. FIG. 5 illustrates the UV-Vis spectra of fraction 10 in DMF prior to, and after sonication for 1 hour. As expected, this was accompanied by a dramatic loss in spectral resolution and the reappearance of the 270 nm π-plasmon peak. Subsequent sonication allowed the observation of only the strongest optically permitted transitions at partial expense of the π-plasmon peak.

EXAMPLE 3

Enrichment for Metallic or Semiconducting SWNTs

Figure 6:
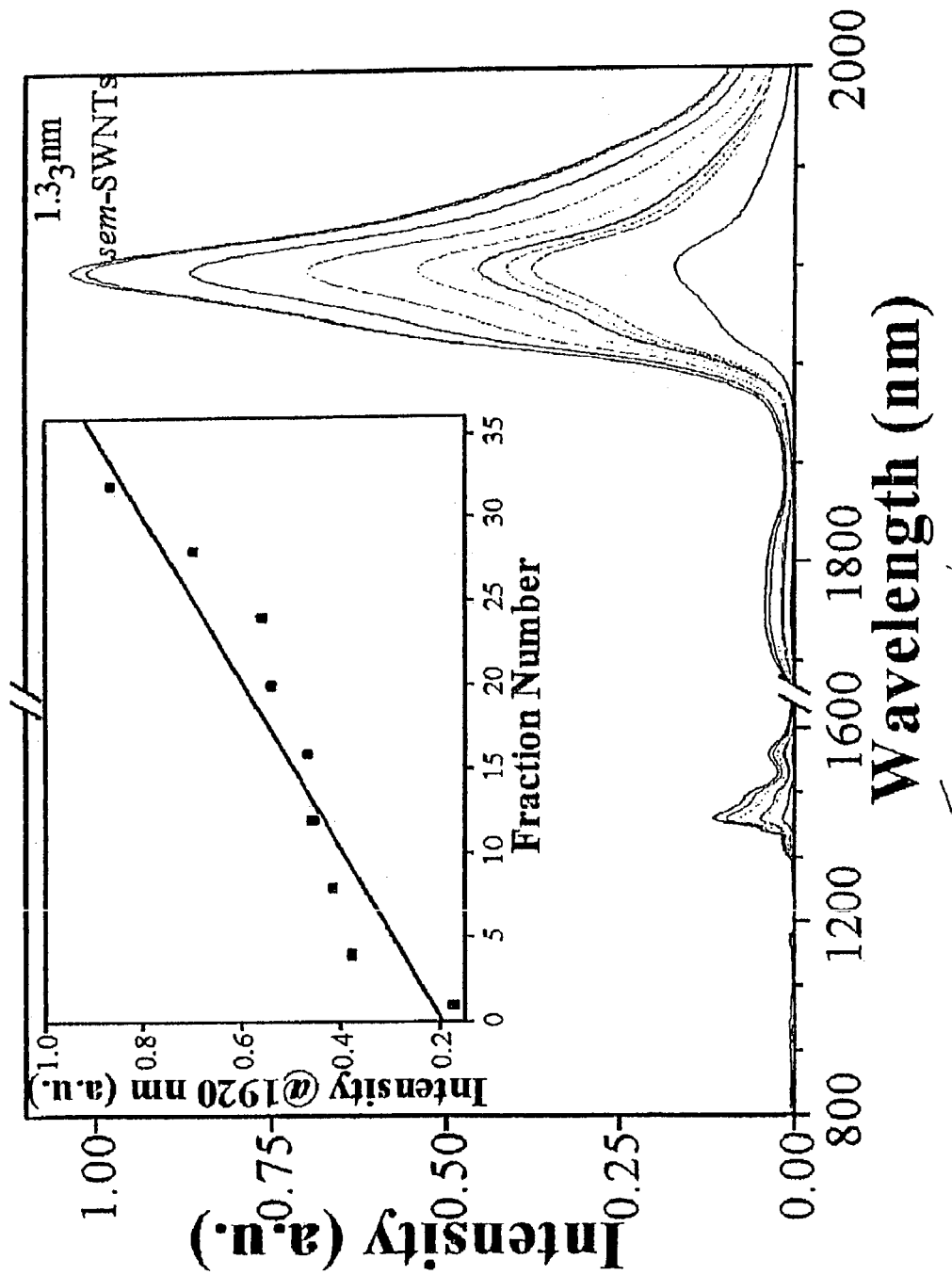
FIG. 6 shows NIR spectra of various elution fractions as collected from the GPC column. The inset plots the intensity at 1920 nm as a function of elution fraction.

The significant strain energy associated with small diameter and structural instability associated with varying helicity of SWNTs have also allowed us to preferentially enrich different fractions with either metallic or semiconducting nanotubes during the oxidative shortening of SWNTs a mixture (7:3) of $HNO_3$ and $H_2SO_4$. FIG. 6 illustrates the NIR spectra of various elution fractions as collected from the GPC column (i.e. with no further solvent (THF) dilution or concentration). The pronounced increase in intensity of the 1920 nm absorption (which unambiguously corresponds to the first pair of singularities for the 1.22 and the 1.33 nm diameter semiconducting SWNTs) as a function of elution fractions (FIG. 6, inset) indicates that shorter nanotubes are enriched in S-SWNTs.

Figure 7:
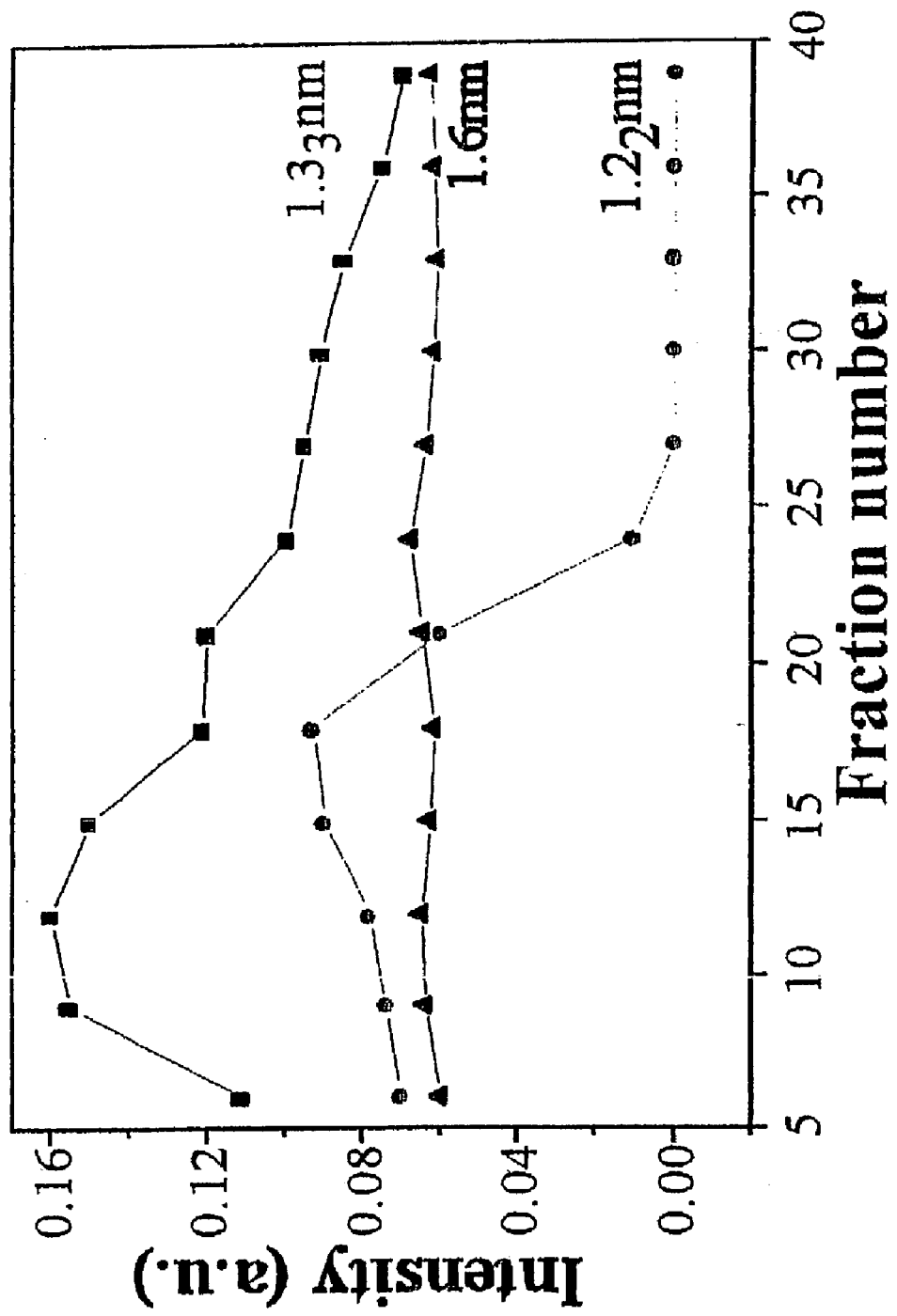
FIG. 7 shows UV-Vis absorption intensities of the 1.22, 1.33 and 1.60 nm diameter metallic sSWNTs (2nd pair of singularities) as a function of elution fraction.

The enhanced nanotube solubility, argued above, permits us also to probe the concentration profile of metallic SWNTs in different elution fractions. FIG. 7 shows plots of the UV-Vis absorption intensities for the 1.22, 1.33 and 1.60 nm diameter metallic sSWNTs as a function of elution fraction. Interestingly enough, while both 1.33 and 1.60 nm diameter metallic sSWNTs are present in varying degree in all elution fractions, the 1.22 nm diameter metallic sSWNTs vanish after the $28^{th}$ fraction. This is particularly important since it indicates that indeed there is a correlation between strain energy associated with small diameter nanotubes and their instability in oxidative environments. Based on this, SWNT samples with shorter nanotube diameter (i.e. those obtained by the HIPCO fabrication method (0.7–1.2 nm in diameter) as opposed to the laser ablated SWNT samples (1.2–1.9 nm in diameter) used in the present study) can preferentially enrich longer SWNTs fractions with metallic nanotubes and shorter SWNTs fractions with semiconductive nanotubes. Repeated fractionation and re-oxidation treatments can further yield better separation for metallic and semiconducting components at either end of their length spectrum.

Figure 8:
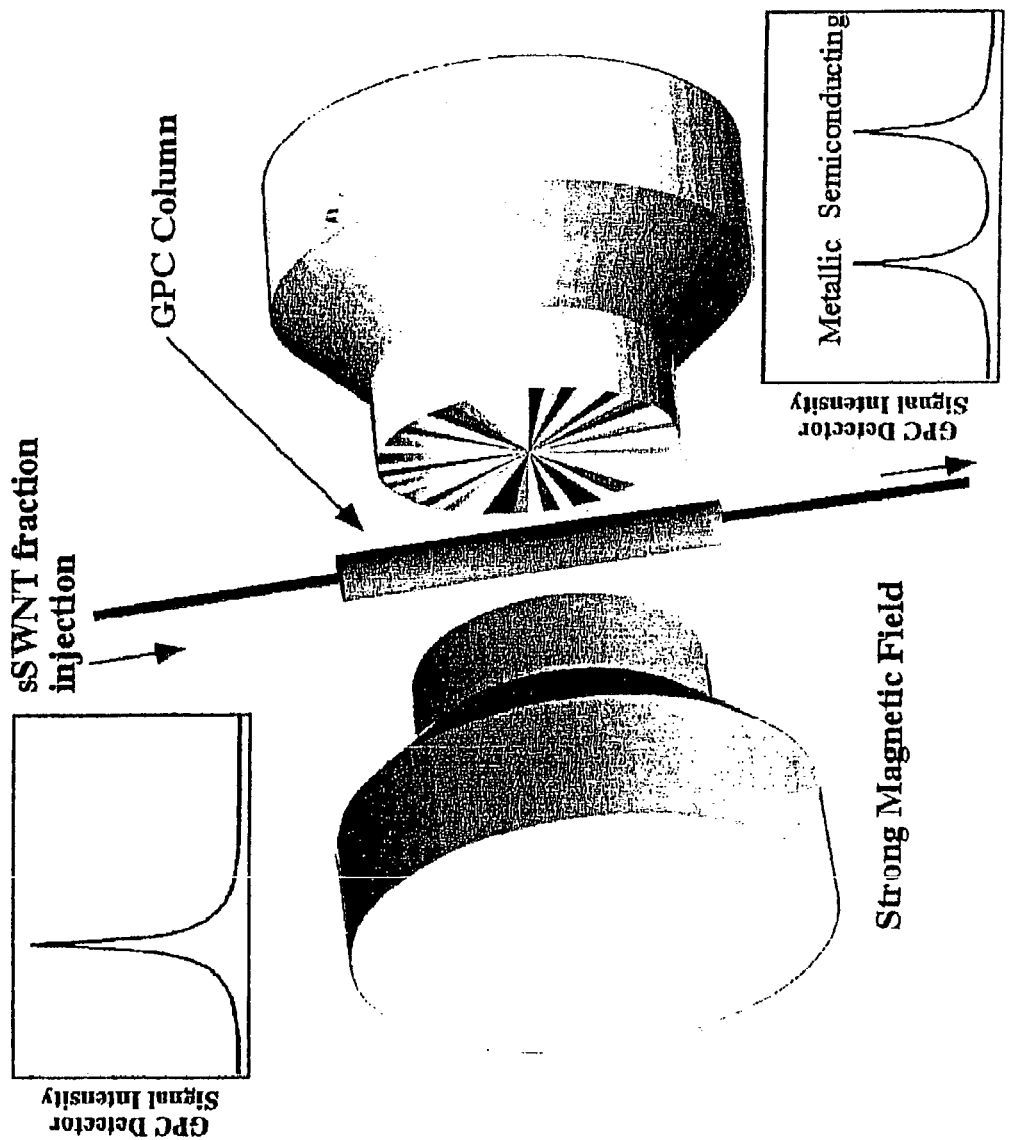
FIG. 8 is a schematic illustration of a methodology for chromatographic separation of metallic from semiconducting sSWNTs in the presence of high magnetic fields.

The inherent anisotropies of metallic and semiconducting nanotubes in magnetic fields during their chromatographic elution can also be employed to accomplish the long-standing issue of nanotube separation by type (metallic versus semiconductive) for equal length SWNTs. This is schematically illustrated in FIG. 8, where a single length fraction containing both metallic and semiconducting sSWNTs is separated during chromatographic elution under high magnetic fields.

EXAMPLE 4

Separation of SWNTs by Diameter

Figure 9:
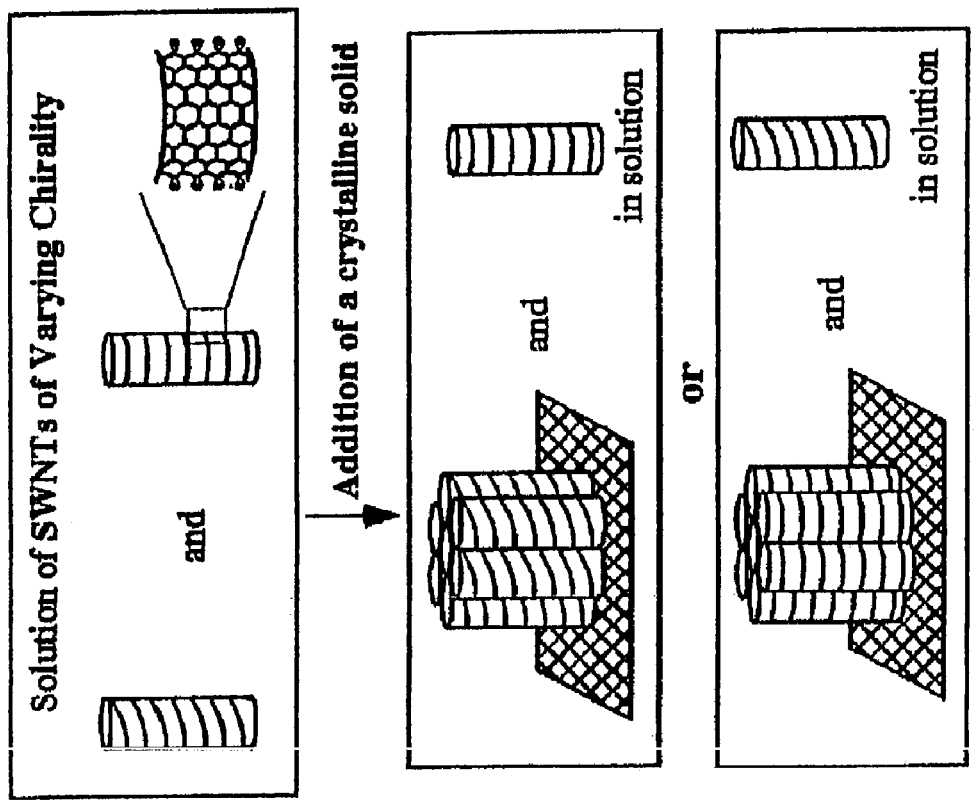
FIG. 9 is a schematic illustration of a close-pack sSWNT rope lattice according to chirality. Preferential substrate-dependent precipitation can take place depending on epitaxial considerations (i.e. the crystalline lattice spacing of the substrate and the SWNT rope lattice crystal).

Similarly, the well-defined diameter-depended number of carboxy groups (on either end of the tube) can help in separating SWNTs by diameter using either electrophoresis or elution over nanoporous stationary phases with well-defined pore sizes. Having well defined sSWNT fractions according to length, type (metallic or semiconducting) and diameter can also permit the separation of these samples according to chirality, either passing them through chiral chromatographic columns or utilizing preferential precipitation/assembly on epitaxial surfaces (see FIG. 9). Here, a precipitation-inducing agent is injected slowly in the solution of sSWNTs and the precipitation of various chirality species is dictated according to the epitaxial matching of the SWNT rope lattice spacing and that of the precipitating substrate. Temperature, acidity, ionic strength and content of organic solvent can all influence the individual stability of these chiral assemblies.

While preferred embodiments have been shown and described, various modifications and substitutions may be made thereto without departing from the spirit and scope of the disclosure. Accordingly, it is to be understood that the present disclosure has been described by way of illustration and not limitation.

What is claimed is:

1. A method of separating M-SWNTs and S-SWNTS comprising:
    solubilizing the nanotubes, wherein the solubilizing comprises noncovalent functionalization of the nanotubes;
    applying the solubilized nanotubes to a gel permeation chromatography column;
    eluting the nanotubes;
    collecting a first number of elution fractions, wherein the first number of fractions collected is sufficient to separate the nanotubes according to size;
    selecting one or more of the collected fractions;
    applying the selected fractions to a second gel permeation chromatography column;
    eluting the nanotubes; and
    collecting a second number of elution fractions, wherein the second elution is performed under a magnetic field sufficient to separate M-SWNTs and S-SWNTs.

2. The method of claim 1 further comprising separating the M-SWNTs or S-SWNTs by diameter.

3. The method of claim 2 wherein separating is by electrophoresis.

4. The method of claim 2 wherein separating is by chromatography over a nanoporous stationary support.

5. The method of claim 1 further comprising separating the M-SWNTS or S-SWNTs by chirality.

6. The method of claim 5 wherein separating is by chromatography through a column capable of separating compounds by chirality.

7. The method of claim 5 wherein separating is by preferential precipitation.

8. The method of claim 7 wherein preferential precipitation is on epitaxial crystalline surfaces.

9. A method of separating nanotubes according to diameter, comprising:
    solubilizing the nanotubes, wherein the solubilizing comprises noncovalent functionalization of the nanotubes;
    applying the nanotubes to a gel permeation chromatography column;
    eluting the nanotubes;
    collecting a first number of elution fractions, wherein the first number of fractions collected is sufficient to separate the nanotubes according to length;
    selecting one or more of the elution fractions; and
    subjecting the fractions to a second separation by diameter.

10. The method of claim 9 wherein the second separation is by electrophoresis.

11. The method of claim 9 wherein the second separation is by chromatography on a nanoporous stationary phase.

* * * * *